United States Patent [19]

Förster

[11] 4,433,426

[45] Feb. 21, 1984

[54] CONTROL SYSTEM FOR PRINTING MACHINES

[75] Inventors: Karl-Heinz Förster, Dresden; Henner Hettmann, Coswig; Volker Eichler, Weinböhla; Albrecht Johne, Dresden; all of German Democratic Republic.

[73] Assignee: VEB Kombinat Polygraph "Werner Lamberz", Leipzig, German Democratic Rep.

[21] Appl. No.: 160,099

[22] Filed: Jun. 16, 1980

[51] Int. Cl.³ .............................................. G06F 7/38
[52] U.S. Cl. ............................................ 377/2; 377/8; 377/16; 377/54; 364/469
[58] Field of Search ... 364/200 MS File, 900 MS File; 235/92 CT, 92 DP, 92 SH; 377/2, 3, 8, 15, 16, 377/17, 18; 101/113

[56] References Cited

U.S. PATENT DOCUMENTS

| | | | |
|---|---|---|---|
| 3,870,868 | 3/1975 | Jones | 377/8 |
| 3,944,794 | 3/1976 | Reehil et al. | 377/8 |
| 4,117,316 | 9/1978 | Honkawa | 235/92 SB |

FOREIGN PATENT DOCUMENTS 2707011 10/1977 Fed. Rep. of Germany.

Primary Examiner—Eddie P. Chan
Assistant Examiner—Tim A. Wiens
Attorney, Agent, or Firm—Michael J. Striker

[57] ABSTRACT

The control system for periodically synchronizing in a sequential order the operation of a plurality of control elements of a printing machine comprises a control shift register having an input coupled to a fine timing device for generating synchronizing pulses corresponding to predetermined angular positions of the machine and another input connected to a sheet feeding control device. The outputs of a predetermined number of first stages in the control shift register are connected to a gating nonoperative time compensator, the control inputs of which are connected to the rotary speed detector and the output of which is connected to an assigned operation control element in the machine. A transfer shift register is connected in series with the control shift register or with the output of the dead time compensator.

7 Claims, 2 Drawing Figures

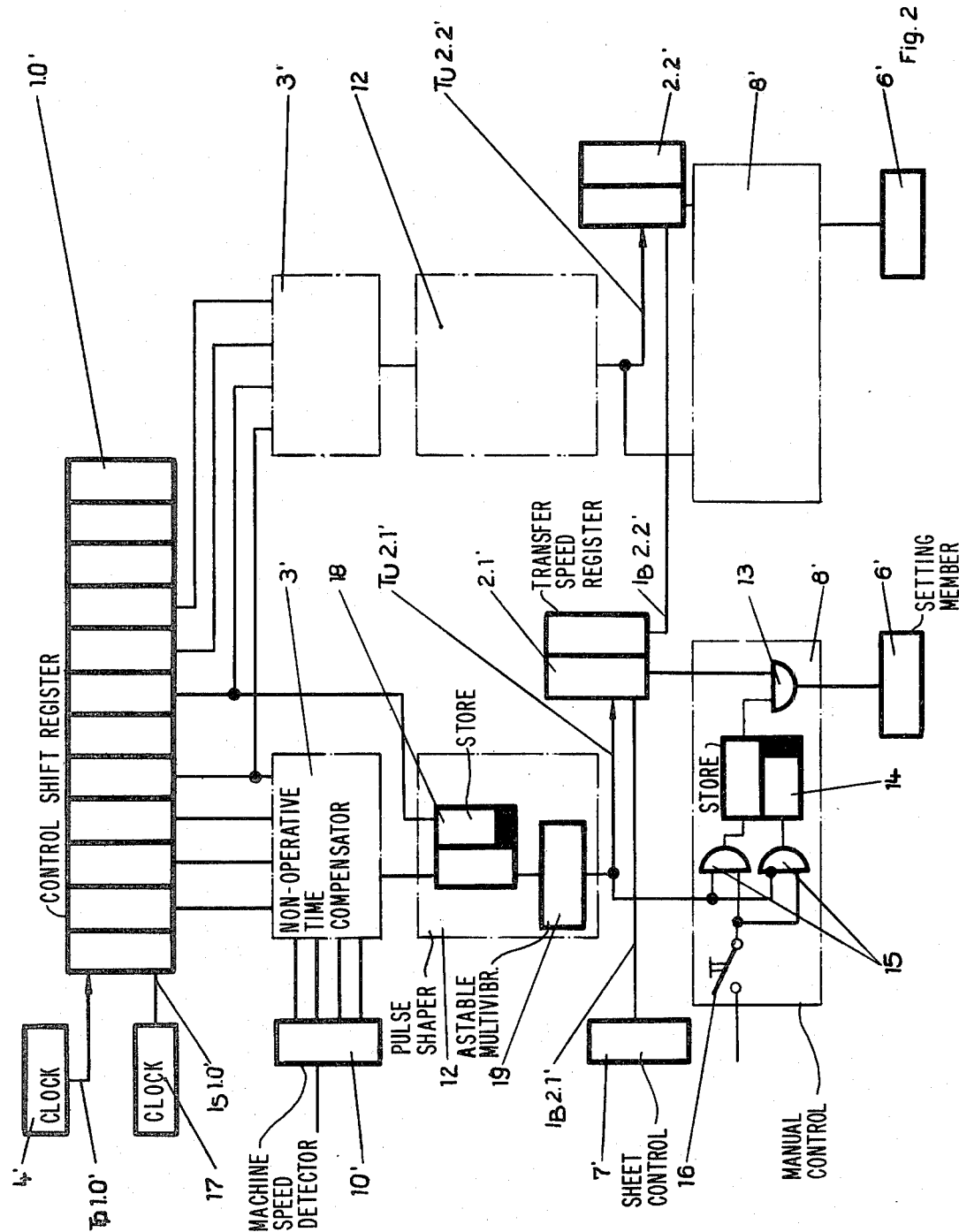

CONTROL SYSTEM FOR PRINTING MACHINES

CROSS-REFERENCE TO RELATED PATENTS

Reference is made to related U.S. Pat. Nos. 3,818,827, 3,966,197 and 4,109,579, assigned to the same assignee, and the entire disclosures of which are incorporated herein by reference.

BACKGROUND OF THE INVENTION

This invention relates to a control system for synchronous and sequentially correct control of groups of functional units in printing machines and in particular to a control system employing shift registers.

Control systems of the above-described type are known for example from the GDR Patent 89 856 in which a shift register is assigned to the sheet feeder and another shift register is assigned to the printing machine whereby both shift registers are connected in series.

From the U.S. Pat. No. 4,109,574, a control device for printing machines is known which is equipped with a shift register for performing the cyclic or synchronized control and moreover with a system for compensating nonoperative or dead times of operational units of the machine. The construction of such prior art devices necessitates very voluminous shift registers in order to achieve a synchronization with a plurality of periodic clock pulses for each cycle of 360° with a relatively exact timing synchronization of the control of the functional groups and at sequentially correct time points. In the cases in which the timing or synchronization is made by means of two or three periodic timing signals per each 360° there is no possibility to achieve any exact synchronized control of the functional units or groups of working elements of the machine at substantially correct time points; on the other hand, the size of the shift register is substantially reduced. In both cases, the expenditure for the control are further increased by the device for providing the necessary compensation of nonoperative times. Such a compensation device must be operative for momentary values of the rotary speed of the machine and is therefore very expensive.

SUMMARY OF THE INVENTION

It is therefore a general object of the present invention to overcome the aforementioned disadvantages.

More particularly, it is an object of the invention to provide an improved control system of the above-described type which employs shift registers whereby the construction can be made with minimum technological and economic expenditures.

An additional object of the invention is to provide such an improved control system which enables a variation of the circuit for the time compensation which is less costly than prior art devices.

A further object of the invention is to provide a control system for an exact periodic synchronization and a correct sequential control of the operation of functional groups in printing machines which employs shift registers having a relatively small capacity.

Furthermore, an object of this invention is to provide such an improved system which enables an advantageous integration of a subsystem for the compensation of nonoperative times into the system of the shift register.

In keeping with these objects and others which will become apparent hereafter, one feature of the invention resides in the provision of a control system for use in printing machines for synchronous and sequentially correct control of functional groups of the machine by means of shift registers which have a clock signal input and an information signal input and each stage of respective registers has an output connected to a circuit for activation of the assigned functional groups.

Preferably, the system includes control shift registers coupled one to another and having one input fed with a plurality of periodic clock or timing pulses generated per each cycle of 360°, and transfer shift registers the synchronizing input of which is fed with a periodic timing pulse per each cycle of 360° and which is preliminarily assigned to the adjustment members.

The control and transfer shift registers are connected in series and the information input of the first stage of the control shift register is connected to a sheet feed operation checking device which generates sheet feed control signals; the information input of the subsequent shift register is connected to the output of the first-mentioned control shift register and the setting elements of the controlled functional group in the machine are coupled to corresponding stages of the control shift registers. In a variation, the timing pulse inputs of the transfer shift register are connected to different outputs of a single control shift register whereby the information input of the control shift register is connected to an additional or third clock signal generator which feeds in the information input a synchronizing signal. The information input at the first stage of the transfer shift register is fed with the sheet feed control signal generated by the checking device for the sheet feeding operation and the information input of each subsequent transfer shift register is connected to the input of the preceding transfer shift register and the setting members of the functional group are coupled to the first stage of the transfer shift register.

Each control shift register cooperates with a device for compensating nonoperative time, the device being formed of a plurality of AND gates each having one of its inputs coupled to an assigned output of a stage of the control shift register and a second input connected to an assigned output of an analog to digital converting and sorting device which converts an analog information about the rotary speed of the machine into a plurality of speed ranges; the outputs of the respective AND gates are connected to the corresponding inputs of an OR gate whereby the output of the OR gate activates the control elements in the assigned functional group of the machine. A pulse suppressing device is arranged between the device for the compensation of the nonoperative times and the timing pulse input of the transfer shift register. The pulse suppressing device includes a storing circuit the setting input of which is connected to the output of the compensating device for the nonoperative time and the resetting input of which is connected to the last stage of the control shift register which succeeds the last stage of the latter which is connected to the device for compensating the nonoperative time. The storing device also cooperates with a subsequent pulse setting device. The control shift register in this case is in the form of a ring counter.

In still another modification of the second embodiment, the additional or third clock or timing device is connected directly to one input of the nonoperative time compensator and the timing or synchronizing pulses of the third clock are spaced apart from one another about an interval defined by the particular working condition of the printing machine under control.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is another embodiment of this invention having parallel-series connected registers.

DESCRIPTION OF THE PREFERRED EMBODIMENTS

Figure 1:
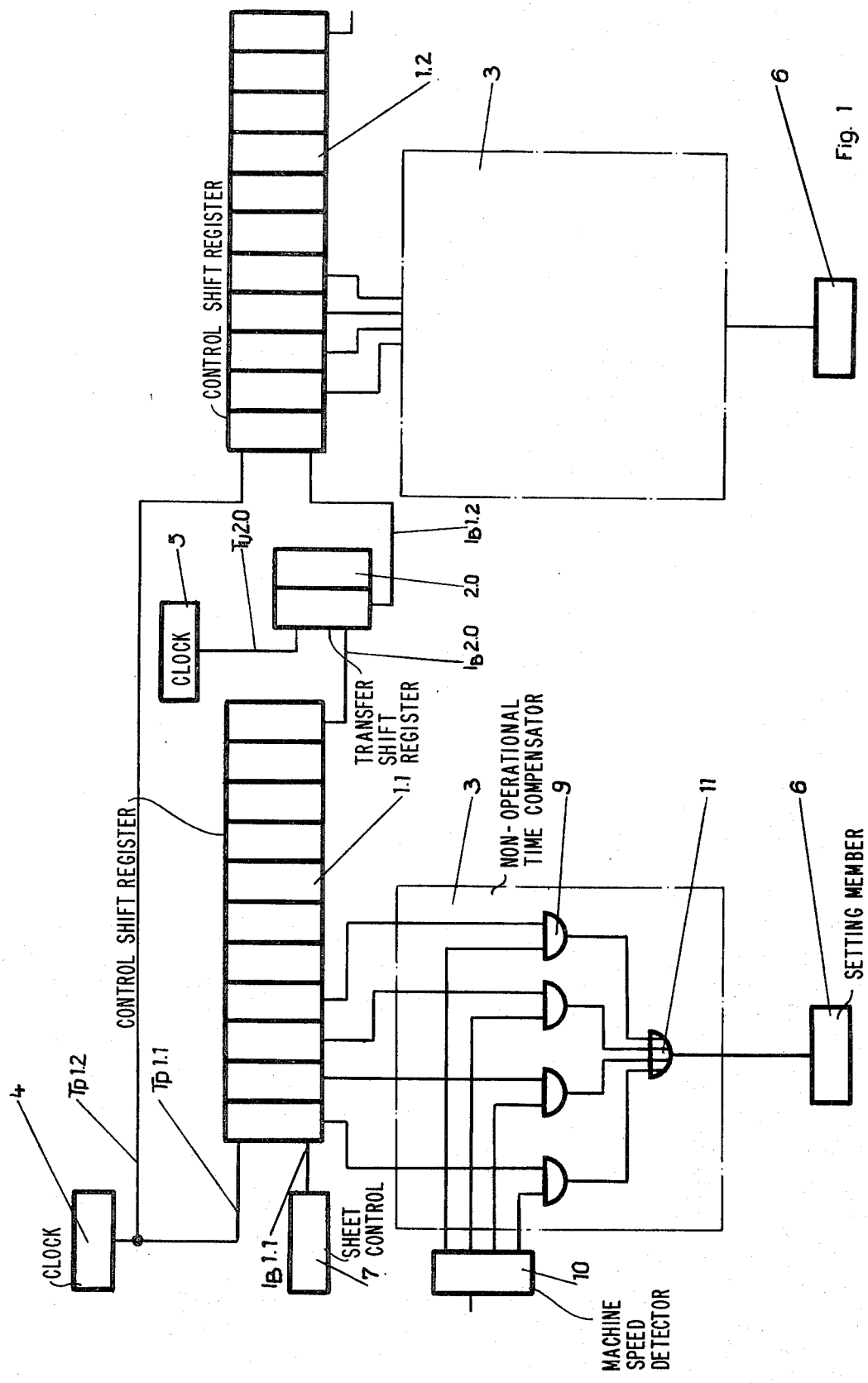
FIG. 1 is a schematic circuit diagram of one embodiment of the control system of this invention having series connected shift registers.

Both embodiments of the control system for an exact periodic synchronization and a correct sequential order of the actuation of respective working elements in consecutive groups of functional units of the printing machine employ interconnected control shift registers 1.1 and 1.2 (FIG. 1) or register 1.0' (FIG. 2) and transfer register 2.0 (FIG. 1) or registers 2.2' (FIG. 2). Both the control registers and the transfer registers have an input for clock or timing signal and an information input. The timing inputs $T_P 1.2$ or $T_P 1.0'$ of the control shift register 1.1 or 1.0' are connected to a first timing device 4 which generates for each cycle of 360° a plurality of clock or timing pulses, for example one pulse at each 30° of the cycle.

The clock or timing input of the transfer shift register is connected to a timing device which generates per each cycle of 360° one timing pulse. In one embodiment of this invention (FIG. 1), the coarse timing device is in the form of a second clock 5 or in another embodiment (FIG. 2) in the form of additional stages 12 and 18 connected to the control shift register 1.0'. At the output of these additional stages one timing signal per each cycle of 360° takes place.

To the outputs of predetermined stages of the control shift registers 1.1, 1.2 and 1.0', is assigned a nonoperative time compensator 3. This compensator 3 includes a plurality of AND gates 9 each having a first input connected to an assigned output of the predetermined first stages of the corresponding control shift register. The number of the stages assigned to the AND gates is determined both by the rate of clock or timing pulses and by the required range for the compensation. If the required compensation range is for example between 0° and 90°, so in the case of timing pulses having repetition rate of each 30°, four stages are necessary for cooperation with the non-operative time compensator 3.

The second inputs of the AND gates 9 are connected to corresponding outputs of a converting and sorting circuit 10. This converting and sorting circuit 10 has an input which is connected to a rotary speed meter connected to the machine under control. The circuit 10 as mentioned before has several outputs connected to the inputs of respective AND gates 9. Each of the outputs represents a certain range of the rotary speed of the machine, for example 0-3000 on the first output, 3000-5000 on the second output and 5000-7000 on the third output and so on.

The conversion of the analog input signal representing the rotary speed into the aforementioned plurality of rotary speed ranges indicated in digital form is well known in the art and therefore need not be discussed in detail.

The OR gate 11 controlled by the outputs of the AND gates 9 has an output connected to the output of the nonoperative time compensator 3. In the first embodiment of this invention, the compensator 3 is directly coupled to the setting member 6 for a particular functional group of the machine.

Referring now to FIG. 1, there is illustrated the first embodiment of this invention. The first control shift register 1.1, and the transfer register 2.0 and the second control shift register 1.2 are connected in series. The control of the setting members 6 for the functional groups of the printing machine takes place directly via the nonoperative time compensator 3 in response to the fine timing pulses (occurring for example each 30° intervals of a cycle).

The coupling of the first control shift register 1.1 to the transfer shift register 2.0 takes place in the stages which are not employed for the control of the setting member 6 and the transfer is effected by means of coarse timing pulses generated for example each 360°. Instead of the 360° coarse pulses it is also possible to make use of any other coarse control differing from the cycle of 360° in accordance with a particular construction of the machine under control.

The information input $I_B 1.1$ of the first control register 1.1 is connected to a control device 7 for the sheet feeder which controls the feeding of each sheet into the machine. The feed information inputs $I_B 2.0$ and $I_B 1.2$ of the subsequent shift registers 2.0 and 1.2 are connected preferably to the output of the last stage of the preceding shift register 1.1 in dependence on the division of a cycle for the fine timing pulses.

The operation of the first embodiment according to FIG. 1 is as follows:

Upon the occurrence of a correctly fed sheet, which is thus ready to advance in the printing machine for a further processing, the sheet control device 7 generates an output signal $I_B 1.1$ which is applied to the input of the first control shift register 1.1. As soon as a fine timing pulse is applied to the other input $T_P 1.1$, the sheet control signal $I_B 1.1$ is entered and the first stage of the first control shift register 1.1 is set. According to the predetermined angular division of the fine timing pulses from the clock 4, each stage of the control shift register 1.1 is assigned to a particular angular value of the working cycle.

In this particular example, the portions reserved for the nonoperative time compensation are 30°, 60°, 90° and 120° and the stages of the first control shift register 1.1 pertaining to these angular values are coupled to the first inputs of respective AND gates 9 in the nonoperative time compensator 3 to apply to these AND gates signals indicative of the occurrence of a sheet feeding operation at a particular finely divided angular position of the machine. In response to a momentary rotary speed of the machine, the second input of one AND gate 9 receives a signal from the speed converting circuit 10 so that the logic condition of this particular gate is fulfilled and the gate, for example, the first AND gate 9 delivers at its output a signal which is transmitted via the OR gate 11 to the setting member 6.

As a consequence, the setting member 6 is activated always in an exact synchronism with the rotary speed of the machine and in a correct sequential order with respect to other working elements or functional unts of the machine. The control system enables that in response to the momentary variations of the working speed of the printing machine indicated by the circuit 10, the setting member 6 is activated at correspondingly different time points. This synchronization is necessary in order to compensate for the nonoperative times of the functional units of the machine which remain constant at any speed of the machine and consequently require an earlier control at high working speeds or a delayed control at low working speeds.

The control shift registers 1.1 and 1.2 enable the control of several setting members 6 of different functional units or groups of such units in the machine. If the sheet feeding information signal is shifted in the last stage of the first control shift register 1.1, it is applied to one input of the transfer shift register 2.0 and shifted further in synchronization with the coarse pulses from the second timing device 5 corresponding in this example to one cycle of the machine. The assignment of the transfer shift registers 2 to the path of movement of the sheet transfer in the printing machine on which no setting members need by synchronously activated has the effect that the control shift registers can be made substantially shorter while their capacity of performing an exact periodically synchronous control of the various functional units or groups of working elements in the machine is maintained.

If desired, additional control and transfer shift registers can be coupled to the output of the registers 1 and 2.

A second embodiment of this invention is illustrated in FIG. 2. There is employed only one control shift register 1.0', the first four stages of which cooperate with a corresponding compensator 3' and with a speed converting circuit 10' in the same manner as described before in connection with the first embodiment. The first timing input $T_P 1.0'$ is connected again with a clock 4' and the information input $I_S 1.0'$ is connected to an additional timing device 17 which delivers to the control shift register 1.0' an additional synchronization signal. The synchronization now can be effected at the beginning of the controlling operation or both at the begining and during the course of the operation of the machine.

The output of the compensator 3' is connected via a pulse shaper 12 to the timing input $T_U 2.1'$ or the first transfer shift register 2.1'. The pulse extender 12 includes a storing circuit 18 having a setting input which is connected to the output of the preceding nonoperative time compressor 3' and also having a resetting input connected to a stage of the control shift register 1.0' which follows of the stage which is coupled to the compensator 3'. The output of the storing circuit 18 is connected to a pulse shaping device 19 such as a monostable multivibrator which shortens the width of the output pulses.

The information input $I_B 2.1'$ of the first transfer shift register 2.1' is connected to the control device 7' for the sheet feeding unit. The information input $I_B 2.2$ of the subsequent transfer shift registers 2.2' is connected to an output of the last stage of the preceding transfer shift register or to a stage corresponding to the assigned rotary angle of the printing machine. The setting members 6' are connected respectively to the first stage of the assigned transfer shift registers 2.1' and 2.2'. If desired, a manual control device 8 is provided between the first stage of respective transfer shift registers 2 and the corresponding setting member 6. The hand operated control device 8 enables a synchronized enagagement and disengagement of respective members 6 from the automatic controlling process during each cycle. The hand operated control device 8 includes an additional AND gate 13 having one input connected to the output of a storing circuit 14 and the other input to the output of the first stage of the transfer shift register 2.1. The inputs of storing circuit 14 are connected to the outputs of AND gates 15 the inputs of which are connected respectively to the output of the pulse extender 12 and to a control element 16.

Preferably, the control shift register 1.0' is in the form of a generally known ring counter. When the shift register 1.0' is connected as a ring counter, the aforementioned third timing device 17 is dispensed with. In another preferred construction of this second embodiment, the third timing device 17 is present but the shift register 1.0' is omitted. The timing signals from the third timing device 17 are generated at different outputs of the device and according to the particular operational conditions of the printing machine the signals are spaced apart about time intervals pertaining to a certain angular distance, for example, about 30°.

The operation of the second embodiment of the control system of this invention is as follows: The control shift register 1.0' is activated in the above-described manner via the timing input $B_P 1.0'$ and the information input $I_S 1.0'$. The latter information input is connected to a third timing device 17 which generates a periodical synchronization signal which upon coincidence with the timing signal from the timing device 4' starts up the opertion of the control shift register 1.0'. The synchronization signal is generated by the third timing device 17 during each 360° cycles of the machine. It is also possible to generate in the device 17 only one synchronizing signal at the beginning of the controlling operation whereby subsequent signal processing in the nonoperative time compensator 3' takes place in the same manner as in the embodiment according to FIG. 1. The signal applied to the nonoperative time compensator 3' is a signal applied within a cycle of 360° (instead of 360° synchronization pulses) which can be modified for any other coarse timing which can be equal, larger or smaller than 360° according to the construction of the particular printing machine, and is applied to a pulse extender 12 where it is extended in length to a pulse width of about 90° in order to prevent a two-fold synchronization of the pulse of 30° during the switching from one rotary speed range to another one. The output from the pulse extender 12 together with the output from the sheet control device 7' is employed for initiating the shifting in the transfer shift register 2.1'. For the purpose of suppressing the two-fold synchronization in the interval of 30°, the pulse stretcher or extender 12 includes a storing device 18 which is fed by the output signal from the nonoperative time compensator 3' and therefore the repeated or two-fold setting into operation of the transfer register 2.2 during the transit from one speed range into another is made ineffective and is reset by a signal which is subsequent to the last signal at the output of the compensator 3'. Thereafter a pulse contraction by means of a stable multivibrator 19 takes place and at the output of the first stage of the transfer shift register 2.2' a signal is generated which is employed for activating via a hand operated control device 8' of the setting member 6'. The hand operated control device 8' enables a synchrounous connection and disconnection of the setting member 6' from the automatic control system.

If the manually operated control element 16 is in its open condition, the signal from the nonoperative time compensator 3' reverses the state of a storing device 14 and in doing so an output signal is generated which activates via the gate 13 the control element 6'. The synchronous activation of the element 6' takes place due to the fact that the second input of the gate 13 is connected to the output of the first stage 2.1' of the transfer shift register 2.

Upon actuation of the control element 16 and upon the presence of a signal at the output of the nonoperative time compensator 3' the storing device 14 remains in its inactive condition, that means no output signal is generated and therefore the AND gate 13 cannot activate the control element 6'.

The sheet feed control signal from the device 7' as mentioned before is applied to the gating input of the transfer shift register 2.1' where it coincides with the output signal from the nonoperative time compensator 3' and the resulting signal is shifted to the subsequent stage and applied to a transfer register for another group of control elements 6'.

As mentioned above, in the preferred embodiment of this invention the rate of the synchronization pulses during each cycle of 360° is again about 30° during each cycle triggered by the third timing device 17. Four stages of the control shift register 1.0' similarly as in the preceding example are again connected to respective inputs of the AND gates in the compensator 3' whereby the other inputs of the AND gates are again connected to the speed detecting device 10'.

It will be understood that each of the elements described above, or two or more together, may also find a useful application in other types of constructions differing from the types described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A control system for providing an exact periodic synchronization of a plurality of working elements of a printing machine having a sheet feeder and a speed detector with a plurality of outputs, comprising at least one control shift register and a transfer shift register each having a clock input, an information input and a plurality of stages provided respectively with an output; a first timing device connected to the clock input of the control shift register; a source of sheet control pulses coupled to the information input of said control shift register to start up the shifting operation; at least one nonoperative time compensator including a logic switching circuit connected to the outputs of said speed detector and to a first group of the stages of said control shift register, and an output connected to one of said working elements ; and a second timing device for generating a synchronizing pulse during each working cycle of the machine, said transfer shift register having its information input connected to one output in another group of stages of said control shift register and its clock input connected to said second timing device to activate a subsequent working element.

2. A control system as defined in claim 1, wherein said control shift register has the output of its last stage coupled to the information input of said transfer shift register, and further including an additional control shift register having its information input connected to the output of said first group of stages of said transfer shift register and its clock input connected to the first timing device.

3. A control system as defined in claim 2, including an additional control shift register coupled to an additional nonoperative time compensator and having its information input coupled to the last stage of said first mentioned control shift register via said transfer shift register.

4. A control system as defined in claim 1, wherein said nonoperative time compensator includes a plurality of AND gates each having one input connected to an output of an assigned stage in said first group of stages in said control shift register and a second input connected to a corresponding output of said speed detector, and an OR gate having its inputs connected to the outputs of respective AND gates and an output connected to one of said working elements.

5. A control system as defined in claim 3, including a pulse extending circuit connected between the nonoperative time compensator and one input of the transfer shift register, said extending circuit including a storing device having a setting input connected to the time compensator and a resetting input connected to a stage of the control shift register following the last stage connected to said time compensator, and the output of said storing device being connected to a pulse shortener, the output of which is connected to said transfer shift register.

6. A control system as defined in claim 3, wherein the control shift register is in the form of a ring counter.

7. A control system for providing an exact periodic synchronization of a plurality of working elements of a printing machine having a sheet feeder, and a speed detector with a plurality of outputs, comprising at least one control shift register and a transfer shift register each having a clock input, an information input and a plurality of stages provided respectively with an output; a first timing device connected to the clock input of the control shift register; at least one nonoperative time compensator including a logic switching circuit connected to the ouputs of said speed detector and to a first group of the stages of said control shift register, and an output; a second timing device for generating a synchronizing pulse during each working cycle of the machine; said transfer shift register having its information input connected to one ouput in another group of stages of said control shift register and its clock input connected to said second timing device to activate a subsequent working element; a third timing device connected to the information input of said control shift register; a source of sheet control pulses coupled to the information input of said transfer shift register to start up the shifting operation; the output of said nonoperative time compensator being coupled via a pulse extender to the clock input of said transfer shift register; and the output of the first stage of said transfer shift register being coupled to the one of said working elements of the machine.

* * * * *